US008121978B2

(12) United States Patent
Wiss et al.

(10) Patent No.: US 8,121,978 B2
(45) Date of Patent: Feb. 21, 2012

(54) DATABASE SYSTEM PROVIDING IMPROVED METHODS FOR DATA REPLICATION

(75) Inventors: Richard Wiss, Boulder, CO (US); Naveen Puttagunta, Milpitas, CA (US); Derek Gerald Reiger, Westminster, CO (US); David R. Setzke, Jr., Boulder, CO (US)

(73) Assignee: Sybase, Inc., Dublin, CA (US)

( * ) Notice: Subject to any disclaimer, the term of this patent is extended or adjusted under 35 U.S.C. 154(b) by 1203 days.

(21) Appl. No.: 10/605,154

(22) Filed: Sep. 11, 2003

(65) Prior Publication Data

US 2004/0098425 A1 May 20, 2004

Related U.S. Application Data

(60) Provisional application No. 60/426,963, filed on Nov. 15, 2002.

(51) Int. Cl.
*G06F 17/30* (2006.01)
(52) U.S. Cl. .................. 707/615; 707/624; 707/634
(58) Field of Classification Search ............... 707/8, 10, 707/100–102, 201–204, 615, 624, 634
See application file for complete search history.

(56) References Cited

U.S. PATENT DOCUMENTS

| | | | |
|---|---|---|---|
| 5,715,450 A | 2/1998 | Ambrose et al. | 707/103 |
| 5,781,910 A | 7/1998 | Gostanian et al. | 707/201 |
| 5,799,321 A | 8/1998 | Benson | 707/201 |
| 5,819,272 A | 10/1998 | Benson | 707/8 |
| 5,832,225 A | 11/1998 | Hacherl et al. | 709/223 |
| 5,884,324 A | 3/1999 | Cheng et al. | 707/201 |
| 5,937,414 A * | 8/1999 | Souder et al. | 707/203 |
| 5,937,415 A | 8/1999 | Sheffield et al. | 707/204 |
| 5,951,695 A * | 9/1999 | Kolovson | 714/16 |
| 5,995,980 A | 11/1999 | Olson et al. | 707/201 |
| 5,999,931 A | 12/1999 | Breitbart et al. | 707/10 |
| 6,122,630 A | 9/2000 | Strickler et al. | 707/8 |
| 6,157,932 A * | 12/2000 | Klein et al. | 707/204 |
| 6,253,211 B1 | 6/2001 | Gillies et al. | 707/201 |
| 6,256,634 B1 | 7/2001 | Moshaiov et al. | 707/100 |
| 6,263,433 B1 | 7/2001 | Robinson et al. | 713/100 |
| 6,269,432 B1 | 7/2001 | Smith | 711/162 |
| 6,304,882 B1 | 10/2001 | Strellis et al. | 707/202 |
| 6,453,326 B1 | 9/2002 | Parham et al. | 707/204 |
| 6,457,011 B1 | 9/2002 | Brace et al. | 707/10 |
| 6,470,333 B1 | 10/2002 | Baclawski | 707/3 |
| 6,473,776 B2 | 10/2002 | Ieong et al. | 707/202 |

(Continued)

OTHER PUBLICATIONS

E Riedel, S Spence, A Veitch, "When Local Becomes Global: An application Study of Data Consistency in a Networked World", Proceedings of the 20th IEEE Int'l Performance, Computing . . . , 2001.*

(Continued)

*Primary Examiner* — Khanh Pham
(74) *Attorney, Agent, or Firm* — Sterne, Kessler, Goldstein & Fox P.L.L.C.

(57) ABSTRACT

A system providing improved methods for data replication is described. A method for replicating a transaction from a primary database to a replicate database while the replicate database remains available for use comprises: recording information about a transaction being performed at a primary database in a transaction log; synchronously copying the information about the transaction in the transaction log to a mirrored transaction log; generating a reconstructed transaction based on the information about the transaction copied to the mirrored transaction log; and applying the reconstructed transaction at the replicate database while the replicate database remains available for use.

37 Claims, 8 Drawing Sheets

U.S. PATENT DOCUMENTS

| | | | |
|---|---|---|---|
| 6,516,327 | B1 | 2/2003 | Zondervan et al. ............ 707/200 |
| 6,574,617 | B1 | 6/2003 | Immerman et al. ................ 707/1 |
| 6,615,223 | B1 * | 9/2003 | Shih et al. ...................... 707/201 |
| 6,622,152 | B1 | 9/2003 | Sinn et al. ...................... 118/681 |
| 6,636,873 | B1 | 10/2003 | Carini et al. ................... 370/445 |
| 6,643,670 | B2 | 11/2003 | Parham et al. ................ 707/201 |
| 6,654,771 | B1 | 11/2003 | Parham et al. ................ 707/204 |
| 6,662,196 | B2 | 12/2003 | Holenstein et al. ............ 707/202 |
| 2002/0055944 | A1 * | 5/2002 | Dyer ............................. 707/202 |
| 2002/0144252 | A1 * | 10/2002 | Straube et al. ................ 717/168 |
| 2006/0089975 | A1 * | 4/2006 | Iwamoto ....................... 709/213 |

OTHER PUBLICATIONS

Wang et al.,"Data Replication in a Distributed Heteroneneous Database Environment: An Open System Approach", IEEE 1994.*

Sun Microsystems Computer Company, The Java Language Environment, A White Paper, Oct. 1995.

Date, C., An Introduction to Database systems, vol. I and II, Addison Wesley, 1990.

Sun Microsystems, Inc., JDBC 3.0 Specification, Final Release, Oct. 2001.

American National Standards Institute, Information Technology—Database languages—SQL, American National Standard ANSI/ISO/IEC 9075, 1992.

American National Standards Institute, Information Technology—Database languages—SQL, American National Standard ANSI/ISO/IEC 9075, 1992.

* cited by examiner

DATABASE SYSTEM PROVIDING IMPROVED METHODS FOR DATA REPLICATION

CROSS REFERENCE TO RELATED APPLICATIONS

The present application is related to and claims the benefit of priority of the following commonly-owned, presently-pending provisional application(s): application Ser. No. 60/426,963, filed Nov. 15, 2002, entitled "Database System Providing Improved Methods for Data Replication", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, created: Sep. 11, 2003, 4:09 p, size: 27 KB; Object ID: File No. 1; Object Contents: Source Code.

BACKGROUND OF INVENTION

1. Field of the Invention

The present invention relates generally to information processing environments and, more particularly, to improved methods for replication of transactions which are posted in a data processing system, such as a database management system (DBMS).

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information may be retrieved from or updated in such files, and so forth, all without user knowledge of the underlying system implementation. In this manner, the DBMS provides users with a conceptual view of the database that is removed from the hardware level.

DBMS systems have long since moved from a centralized mainframe environment to a de-centralized or distributed environment. Today, one generally finds database systems implemented as one or more PC "client" systems, for instance, connected via a network to one or more server-based database systems (SQL database server). Commercial examples of these "client/server" systems include Powersoft® clients connected to one or more Sybase® Adaptive Server® Enterprise database servers. Both Powersoft® and Sybase® Adaptive Server® Enterprise (formerly Sybase® SQL Server®) are available from Sybase, Inc. of Dublin, Calif. The general construction and operation of database management systems, including "client/server" relational database systems, is well known in the art. See e.g., Date, C., "An Introduction to Database Systems, Volume I and II", Addison Wesley, 1990; the disclosure of which is hereby incorporated by reference.

Each day more and more users base their business operations on mission-critical systems which store information on server-based database systems, such as Sybase® Adaptive Server® Enterprise. As a result, the operations of the business are dependent upon the availability of data stored in their databases. Because of the mission-critical nature of these systems, users of these systems need to protect themselves against loss of the data due to software or hardware problems, disasters such as floods, earthquakes, or electrical power loss, or temporary unavailability of systems resulting from the need to perform system maintenance.

One well-known approach for users to guard against loss of critical business data is to maintain a standby or replicate database. A replicate database is a duplicate or mirror copy of a given database that is maintained either locally at the same site as the primary database or remotely at a different location than the primary database. The availability of a replicate copy of a given database enables a user (e.g., corporation or other business) to reconstruct a copy of a given database in the event of the loss, destruction, or unavailability of the primary database. However, installing and maintaining a replicate copy of a given database requires a considerable investment in hardware, software, and services, particularly if the primary database is a large, mission-critical system handling large transaction volumes. Once a user has made the investment in the hardware, software and services necessary to install and maintain a replicate database, the user would like to be able to use the replicate database system for ancillary purposes such as decision support, reporting applications, and database backup. This allows for a better return on the user's investment in the replicate system hardware and software and also serves to reduce the operating load on the primary system.

Current disk mirroring technology can be used to create and maintain a replicate copy of a database. Disk mirroring technology creates a replicate database by replicating file-level changes in the file system used by the primary database to the file system used by the replicate database. However, a drawback of current disk mirroring technology is that the replicate copy of the database cannot be used while the disk mirroring system is actively updating the replicate file system. This impairs the use of the replicate database system for ancillary purposes such as decision support and reporting applications.

Another current approach for creating a replicate database involves the use of logical replication technology that can capture database changes at a primary database and apply those changes to a replicate database. Logical replication can be performed either asynchronously or synchronously. In an asynchronous logical replication system, a replication agent is used to read the database log and send the database operations to the replicate database. In this type of system, operations can be applied to the primary database before they are read from the log and sent to the replicate database. As a result, asynchronous logical replication does not guarantee that all the changes made to the primary database will be applied to the replicate database if the primary database unexpectedly stops working. In fact, asynchronous logical replication has some of the same limitations as trying to replicate a database from a tape backup. Many users regularly backup their databases to tape backup systems. A replicate (or copy) of the database can be constructed from this backup tape. However, any changes made to the database since the last backup was taken will be lost. Because users frequently require a replication methodology which guarantees that no database operations will be lost, asynchronous logical replication is unsuitable for many users. Another drawback of the asynchronous logical replication approach is that it results in latency between the time data is available at the primary database and the time it is available at the replicate database.

Synchronous logical replication guards against the problem of lost database operations by applying the operations at the replicate database at the same time that they are applied at the primary database. Synchronous logical replication operates in a manner similar to the two-phase commit protocol to ensure that operations are applied at both the primary and the replicate database. In addition, synchronous logical replication results in low latency between the time the data is available at the primary database and the time it is available at the replicate database. However, the "two-phase commit" approach of synchronous logical replication can drastically affect the performance of the primary database. This adverse performance impact makes the synchronous logical replication approach unsuitable for most applications.

As described above, existing solutions provide trade-offs in solving the various problems to be addressed in supporting a database environment that includes both primary and replicate databases. The problems to be addressed include avoiding data loss, reducing latency, improving performance, and increasing the availability of the replicate database. There is no current replication solution that guarantees that no database operations are lost, provides for low latency of the data being available at the replicate database, allows the replicate database to be continuously available, and still provides the performance necessary in today's computing environments.

What is required is a replication solution which guarantees that all transactions applied to the primary database are also applied to the replicate database, provides very little latency between the time data is applied to the primary database and the time it is applied to the replicate database, and makes the replicate database available to users while data is being replicated from the primary database. In addition, the solution should perform these tasks in a manner that does not adversely impair performance of the primary database system. The present invention provides a solution for these and other needs.

SUMMARY OF INVENTION

A system providing improved methods for data replication is described. In one embodiment, a method for replicating a transaction from a primary database to a replicate database while the replicate database remains available for use comprises: recording information about a transaction being performed at a primary database in a transaction log; synchronously copying the information about the transaction in the transaction log to a mirrored transaction log; generating a reconstructed transaction based on the information about the transaction copied to the mirrored transaction log; and applying the reconstructed transaction at the replicate database while the replicate database remains available for use.

In another embodiment, a system for replicating transactions from a source database to a standby database comprises: a source database having a transaction log, the transaction log for recording log records for transactions performed at the source database; a mirrored transaction log for recording mirror copies of the log records for transactions performed at the source database; a file mirroring module for synchronously replicating log records from the transaction log to the mirrored transaction log as transactions are performed at the source database; a log reader module for reading log records in the mirrored transaction log and reconstructing transactions for application at the standby database based upon log records in the mirrored transaction log; and a distribution module for applying the transactions reconstructed by the log reader module at the standby database.

In another embodiment, a method for replicating a database operation from a first database to a second database while making the second database available for decision support purposes comprises: as a database operation is performed at the first database, generating at least one log record characterizing the operation; synchronously recording at least one log record in a first log associated with the first database and a second log associated with the first log; and while the second database is available for decision support purposes, replicating the operation performed at the first database at the second database by performing the substeps of: constructing a replicate operation based, at least in part, on at least one log record in the second log; and applying the replicate operation at the second database.

DETAILED DESCRIPTION

Glossary

Figure 1:
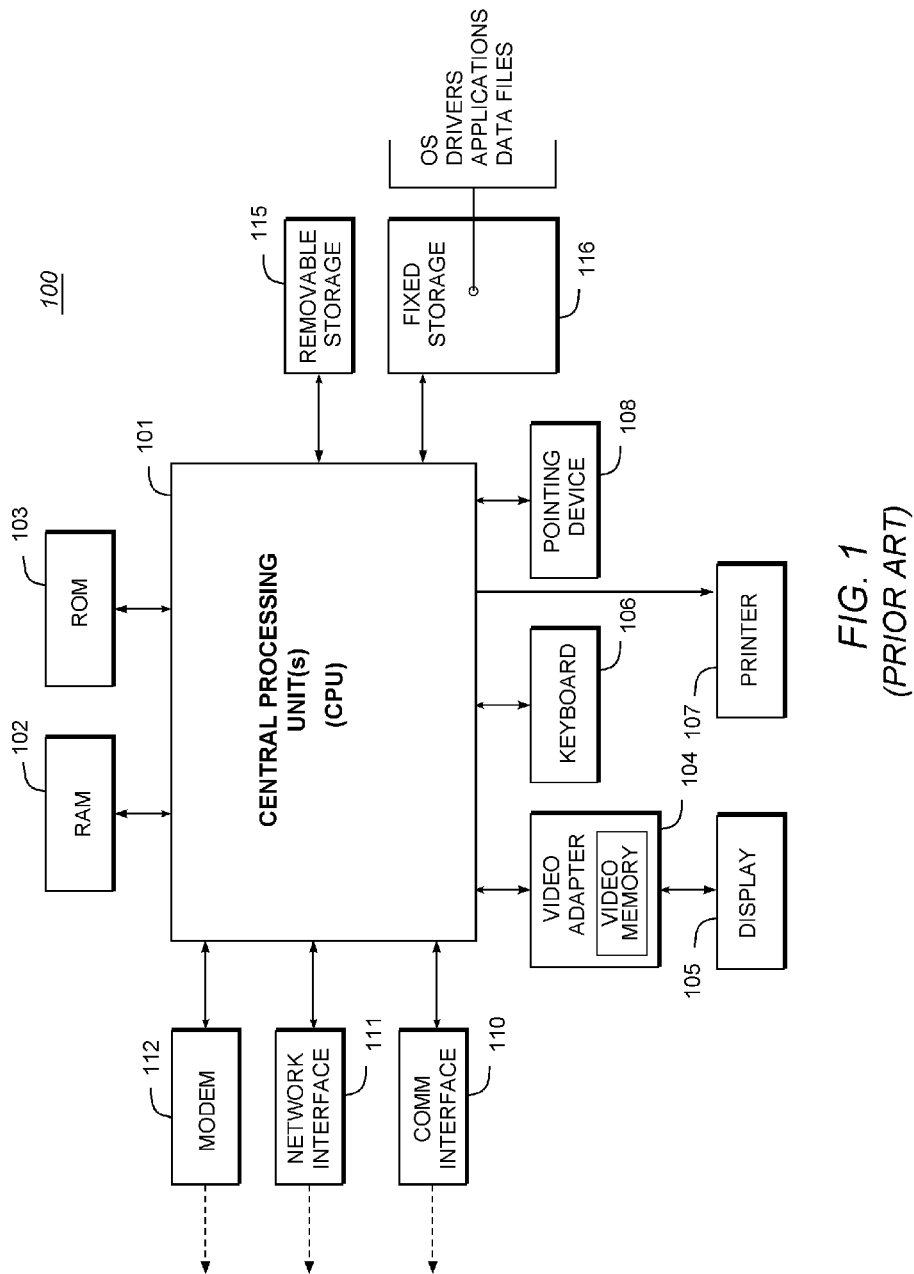
FIG. 1 is a block diagram of a computer system in which software-implemented processes of the present invention may be embodied.

The following definitions are offered for purposes of illustration, not limitation, in order to assist with understanding the discussion that follows.

Java: Java is a general-purpose programming language developed by Sun Microsystems. Java is an object-oriented language similar to C++, but simplified to eliminate language features that cause common programming errors. Java source code files (files with a .java extension) are compiled into a format called bytecode (files with a .class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper", Sun Microsystems Computer Company, October 1995, the disclosure of which is hereby incorporated by reference. See also e.g., "Java 2 SDK, Standard Edition Documentation, version 1.4.1", from Sun Microsystems, the disclosure of which is hereby incorporated by reference. A copy of this documentation is currently available via the Internet (e.g., at java.sun.com/j2se/1.4.1/docs/index.html).

JDBC: JDBC is an application-programming interface (API) that provides database access from the Java programming language. For further information on JDBC, see e.g., "JDBC 3.0 API Documentation", from Sun Microsystems, the disclosure of which is hereby incorporated by reference. A copy of this documentation is currently available via the Internet (e.g., at java.sun.com/products/jdbc/download.html#corespec30).

Log reader module: The log reader module is a component of the present invention that reads database transaction log entries from a mirrored log which contains copies of transaction log entries made at the primary data server. The log reader is also responsible for truncating the log in support of replication and providing the ability to position appropriately in the log in support of replication recovery features. The log reader module of the present invention is described in more detail below in this document.

Materialization: Materialization refers to the process of populating replicate tables with data described in a replication definition to which the replicate table is subscribed. Materialization may be either automatic or manual (bulk), and either atomic (updates to the primary database stopped until a copy of the content is taken) or non-atomic (updates to the primary database continue while a copy of the content is taken).

Primary database or primary database server (PDS): The primary database is the database containing the data that is replicated to the standby (or replicate) database through the use of the replication methodology of the present invention. The primary database is also known as the "source" database as it is the source of the data being replicated (i.e., where data is being replicated from).

Replicate database or standby database: The replicate database or standby database is the database that is a copy of the primary database. The replicate database may be located at the same site (i.e., same physical location) as the primary database or at a different site. The data content of replicate database is kept in "near real-time" synchronization with the primary site via the replication of data change transactions as described in further detail in this document. For the purposes of a disaster recovery replication environment, the replicate or standby database is always located at a remote site.

SQL: SQL stands for Structured Query Language, which has become the standard for relational database access, see e.g., "Information Technology—Database languages—SQL", published by the American National Standards Institute as American National Standard ANSI/ISO/IEC 9075: 1992, the disclosure of which is hereby incorporated by reference. For additional information regarding SQL in database systems, see e.g., Date, C., "An Introduction to Database Systems, Volume I and II", Addison Wesley, 1990, the disclosure of which is hereby incorporated by reference.

Transaction: A transaction is well-defined set of database operations (any combination of one or more database inserts, updates, and deletes) that are accepted or rejected as a whole. Each insert, update, or delete within a transaction is referred to as a "transaction operation" or simply an "operation".

Transaction Log or Log: A transaction log (also referred to herein as a log or log file) contains log records of transactional operations affecting a database. Every transaction operation, including inserts, updates, deletes, DDL operations, and Procedure operations causes a log record to be written to the log. Each particular log record characterizes the change which has occurred to the database during processing of a transaction. These log records can be used, for instance, in error recovery, to restore the database to a preexisting, consistent state.

Introduction

Referring to the figures, exemplary embodiments of the invention will now be described. The following description will focus on the presently preferred embodiment of the present invention, which is implemented in desktop and/or server software (e.g., driver, application, or the like) running under an operating system, such as the Microsoft® Windows operating system. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
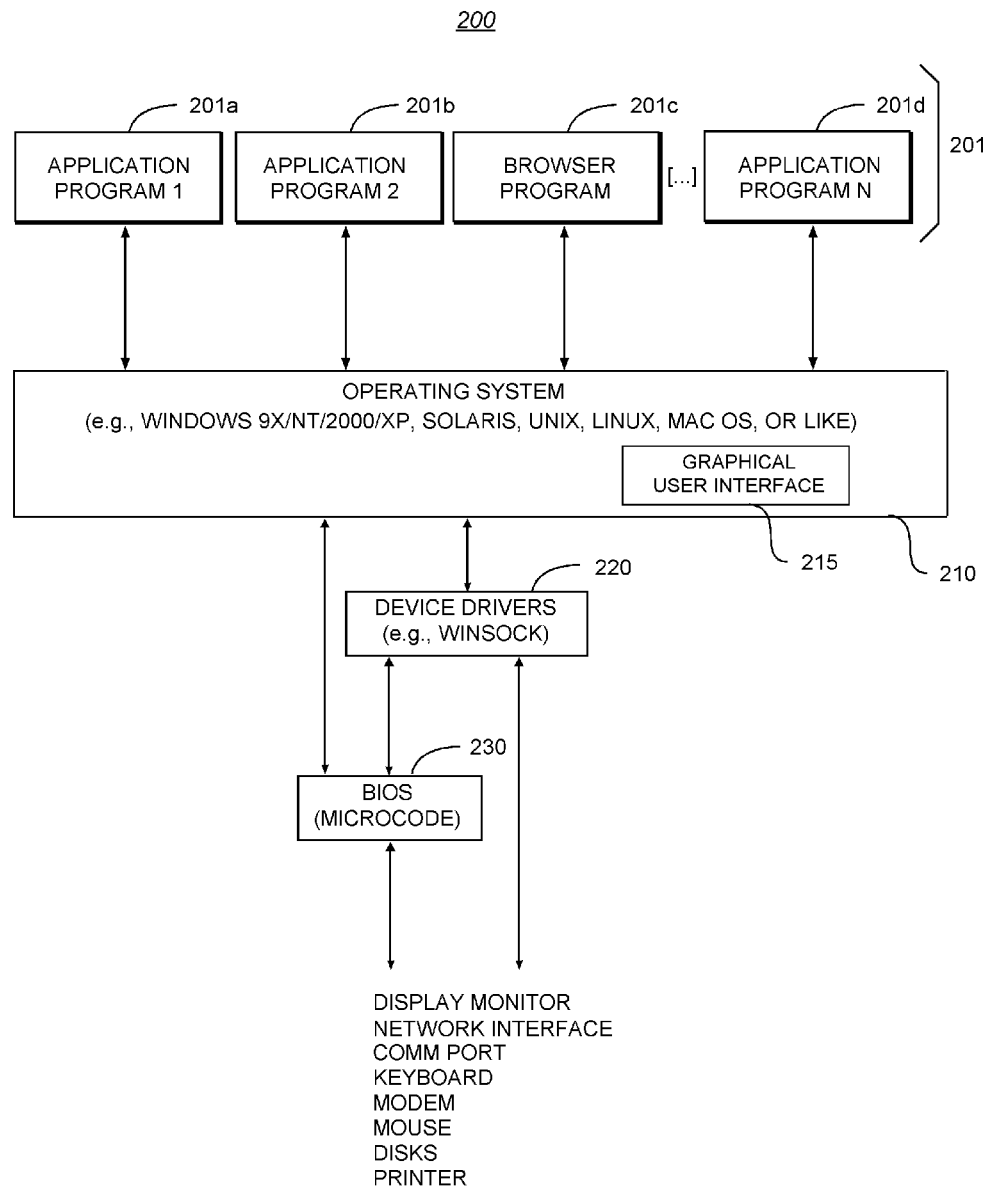
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there one or more clients (e.g., personal computers) which communicate with a primary database server to perform database operations and that such database operations are replicated to a secondary (or replicate) database server to guard against loss or unavailability of the primary database. The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview

The present invention provides a replication solution in which disk mirroring technology is combined with logical replication so that no database operations are lost if the primary database stops working. The solution also enables the replicate database to be used while data is being replicated from the primary database to the replicate database while also providing an acceptable level of performance at the primary database system. The approach of the present invention is to use disk mirroring to replicate the primary database transaction log to a mirrored primary database transaction log (hereinafter sometimes referred to simply as the "mirrored log" or the "mirrored transaction log") which is typically at a remote location (the mirrored primary database transaction log site). Transactions are then read from the mirrored log and are reconstructed for application to the replicate (standby) database system.

If this disk mirroring operation is performed synchronously then all database operations contained in the log at the primary database are guaranteed to also be contained in the mirrored log at the mirrored log site. At the same time that disk mirroring is writing to the mirrored primary database transaction log (i.e., the replica of the primary database log at the mirrored log site), logical replication is being applied to the replicate database with the changes in the mirrored primary database transaction log. This logical replication is performed asynchronously and there may be some latency between the update of the mirrored primary database transaction log and the application of these updates to the replicate database. In the event that the primary database stops working, logical replication continues to be applied to the replicate database based on transactions in the mirrored primary database transaction log enabling all of the database operations applied to the primary database to also be applied to the replicate database. This guarantees that no database operations are lost in the event of loss or damage to the primary database.

In addition to providing a replication solution that ensures that any transactions applied to the primary database are also applied to the replicate system, the present invention also results in very low latency between the application of database operations (e.g., operations resulting from transactions) to the primary database and the application of the same operations to the replicate database. The methodology of the present invention also makes the replicate database on-line and available to users while data is being replicated from the primary database.

The replication solution of the present invention provides a means for capturing the changes made to the primary database and sending those changes to the mirrored (replicate) site in a manner simultaneous with the changes being made at the primary database. Changes to a database are made on a transaction-by-transaction basis. A transaction typically contains some number of database operations such as SQL INSERT, UPDATE, DELETE, DDL, or Procedure operations. When a transaction is committed at the database (i.e., at the primary database) all of the operations within the transactions are atomically applied to the database. In a typical database system, multiple transactions can be in the process of being applied to the database at any given time. This results in the operations of any given transaction being interwoven with the operations of other concurrent transactions. Accordingly, it is important that the commit order of transactions is preserved at the replicate database. It is also important that once changes are made to the primary database, the replication solution must ensure that these changes are available and can be applied at the replicate database no matter what might happen to the primary database or the site at which the primary database is located. Although there can be some latency in applying these changes to the replicate database, the method of the present invention provides that none of the changes are lost if something happens to the primary database or to the physical site of the primary database (assuming that the mirrored primary database transaction log is at a different physical location). In addition, the methodology of the present invention also enables latency to be kept relatively low (seconds or minutes) so that the data in the replicate database is as current as possible.

Significantly, the present invention also makes the replicate database available for use while replication of data from the primary database is taking place. This enables users to make better use of the replicate system hardware and software and can also serve to reduce the operating load on the primary system.

In an alternative embodiment, the disk mirroring operation may be performed asynchronously rather than synchronously. This alternative embodiment provides the same result as using logical replication technology (i.e., it may not guarantee that no database operations are lost in the event of failure of the primary database). However, this alternative embodiment can provide performance advantages both in terms of a reduced performance impact on the primary database and in terms of the latency of the data being applied to the replicate database compared to existing logical replication technology.

System Components

Figure 3:
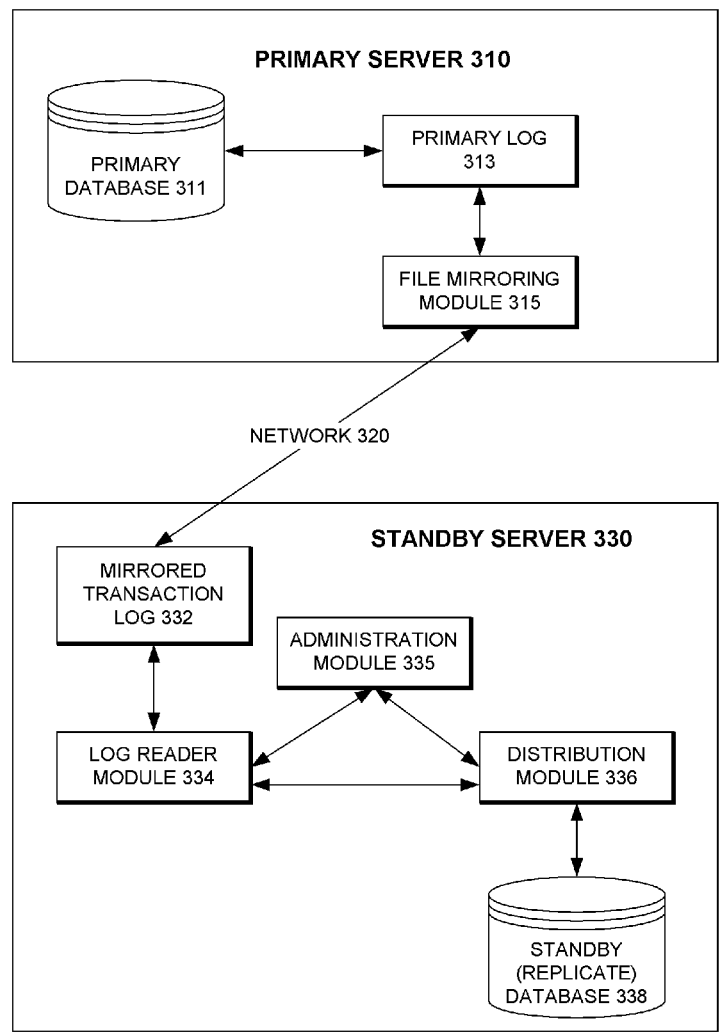
FIG. 3 is a high-level block diagram of an exemplary environment in which a database system providing the improved replication methodology of the present invention may be embodied.

FIG. 3 is a high-level block diagram of an exemplary environment 300 in which a database system providing the improved replication methodology of the present invention may be embodied. As shown, environment 300 includes a primary server 310 connected via a network 320 to a standby (or replication) server 330. The primary server 310 may be located at the same site as the standby server 330 or may be located at a different location. In the currently preferred embodiment, the components running on (or located at the same site as) the primary server 310 include a primary database 311, a primary (transaction) log 313, and a file mirroring module 315. The components running on (or located at the same site as) the standby server 330 include a mirrored primary (transaction) log 332, a log reader module 334, an administration module 335, a distribution module 336, and a standby (or replicate) database 338. The operation of each of these components will now be described.

The primary database 311 is the database containing the data that is replicated to the standby (or replicate) database 338 through the use of the replication methodology of the present invention. The primary database 311 is also known as the "source" database as it is the source of the data being replicated (i.e., where data is being replicated from). In the currently preferred embodiment, the primary database is implemented as a Sybase® Adaptive Server® Enterprise database. However, the primary database may alternatively be implemented as another type of database or file system.

The primary database 311 is typically used to support the operations of a user application or system (not shown). For instance, the primary database 311 may be employed to support an on-line transaction processing (OLTP) application, such as a sales and order processing application. As the application operates, the posting of data from "transactions" are posted to one or more database tables of the primary database 311. As part of this process, the primary database 311 employs a logging system to log changes which occur to the system. In a commercial embodiment such as Sybase Adaptive Server Enterprise, this is done by copying log records to the (primary) transaction log 313. For further information on logging operations in a database system, see e.g., U.S. Pat. No. 6,321,234 titled "Database server system with improved methods for logging transactions". Every transactional operation, including inserts, updates, and deletes to the database, causes a log record to be written to the (primary) transaction log 313 (which is referred to simply as the "log" or "transaction log"). Each particular log record characterizes the change which has occurred to the primary database 311 during processing of a transaction. These log records can be used, for instance, in error recovery, to restore the database 311 to a preexisting, consistent state. Of particular interest to the present invention, these log records are also used for replication of transactions posted to the primary database 311 to the secondary database 338 as hereinafter described.

The file mirroring module 315 is a disk mirroring module responsible for synchronously mirroring the primary log 313 of the primary database to the mirrored primary transaction log 322 (or simply "mirrored log") which is typically located at the same site as the standby server 330. The file mirroring module 315 may be implemented as a standard file replication hardware and/or software solution available from a number of different vendors. Representative file replication hardware and software solutions that may be used for replication of the log records include Symmetrix Remote Data Facility (SRDF) from EMC Corporation of Hopkinton, Mass. and SnapMirror from Network Appliance, Inc. of Sunnyvale, Calif.

In operation, the file mirroring module 315 replicates the log records from the primary log 313 on the primary server 310 to the mirrored log 332 which is typically located at the same site as the standby server 330. The file mirroring module 315 is a disk mirroring technology that replicates the log record data very quickly and efficiently. In addition, in the currently preferred embodiment of the present invention the file mirroring module operates synchronously. When log records are written from the primary database 311 to the primary log 313, copies of these log records are written at the same time to the mirrored primary log 332 at the standby location. This guards against any loss of data in the event of a problem with the primary database server.

At the standby server 330, the log reader module 334, administration module 335, and distribution (or distributor) module 336 operate to reconstruct the transactions against the primary database for application to the replicate (or standby) database 338 from the log records in the mirrored primary log 332. SQL transactions are reconstructed from the replicated log records in the mirrored primary log 332 and are applied to the standby database 338. The methodology of the present invention enables the standby database 338 to be on-line and available at the same time that transactions are being replicated to this database. The log reader module 334, administration module 335, and distribution module 336 of the present invention will now be described in more detail.

The log reader module 334 is responsible for reading log records from a database log (i.e., the mirrored primary database log 332). It is also responsible for log management in the case of multiple log files (both online and archived). The log reader module 334 has access to primary database schema metadata in order to fully read and understand a log record in the mirrored primary database log. The log reader module 334 has interfaces with the mirrored primary database log 332, the administration module 335, and the distribution module 336. In operation, the log reader module reads the mirrored primary database log 332 and uses the schema information, which is managed by the administration module, to build a complete transaction operation. It then queues the transaction for delivery by the distribution module 336 to the replicate database 338.

The distribution module 336 is responsible for formatting and sending log records to a destination (e.g., replicate database 338) in a manner that is consistent with how the original transaction was executed at the primary database 311. The distribution module 336 has interfaces with the log reader module 334 and the replicate database 338. The distributor 336 reads a transaction (which may contain one or more operations) from the queue populated by the log reader module 334. The distributor then formats the transaction operation(s) (e.g., into a Structured Query Language (SQL) statement) and executes the transaction operation(s) at the replicate database 338 (e.g., via a JDBC database connection). The distribution module is also responsible for keeping track of the last committed transaction in order to avoid missing or duplicating any transactions.

The administration module 335 is responsible for integrating and managing the operation of the other system components. This includes system property and state management as well as command routing services. The administration module 335 also provides an interface that all components can use for storage of system metadata, such as the primary database schema information. In addition, the administration module is responsible for system initialization on startup. This includes all setup required on initial startup as well as error checking on subsequent startups of the replication system. The administration module 335 has interfaces with the primary database 311 and the log reader module 334. On initial startup, the administration module 335 captures schema from the primary database and keeps it in an internal format for access by the log reader module 334.

In the currently preferred embodiment, each table and procedure is represented and stored internally by the administration module 335 for use by the log reader module 334 in interpreting log records in the duplicate log 332. The system and methodology of the present invention also enables the log reader module 334 to correctly read and interpret log records before (and after) a change in schema structure through a technique referred to as "schema versioning". The schema versioning technique enables the log reader module 334 to read records in the log that occur prior to a change in schema structure (e.g., a table or procedure altered or dropped) by associating a version identifier (version ID) in addition to a database object identifier (object ID) with each version of a table or stored procedure. When a table or procedure is modified (e.g., by a DDL operation), a new representation of the database object is created and identified by both the database object ID and version ID. Thus, when the log reader module 334 reads log records in the mirrored log 332, the database object ID and version ID are used in combination to make sure the correct representation of the database object is used to interpret the log record.

It should be noted that in order to fully support a disaster recovery solution, the administration module 335 only accesses the primary database during initialization. At no other time does the administration module require direct access to the primary database. The operations of a system constructed in accordance with the present invention in replicating a given transaction posted to a primary database system will now be described.

Detailed Operation

Methods of Operation

Figure 4A:
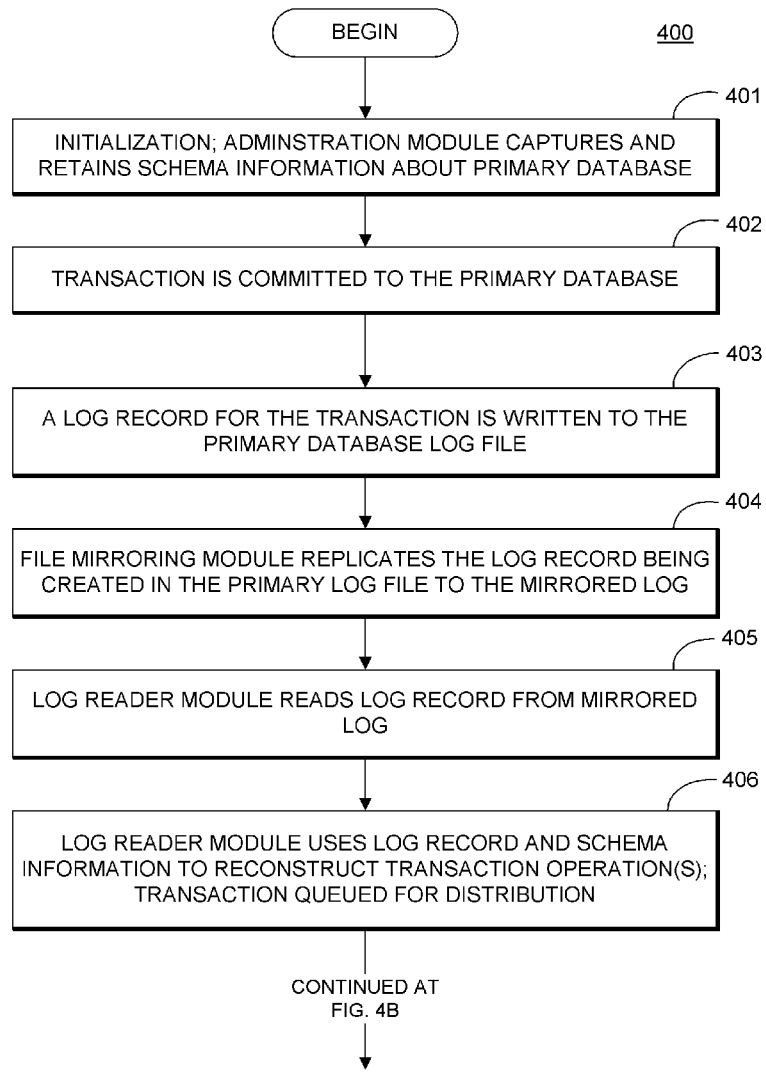
FIGS. 4A-B comprise a single flowchart illustrating the operations of the system of the present invention in replicating data from a primary database to a standby (or replicate) database.
Figure 4B:
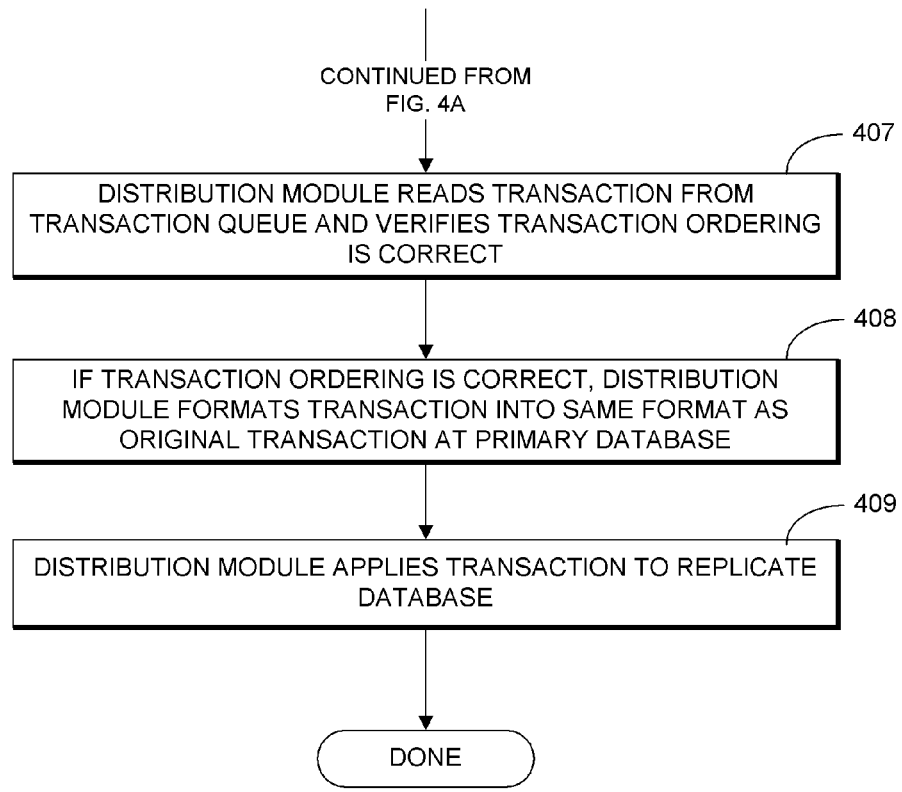

FIGS. 4A-B comprise a single flowchart 400 illustrating the improved methodology of the present invention for replicating data from a primary database to a standby (or replicate) database. The following discussion uses as an example the replication of a single transaction posted to a primary database server to a standby (or replicate) database server to explain the operations of the replication solution of the present invention. However, the methodology of the present invention may also be applied for replication of a plurality of transactions posted to a primary database from time to time. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

Initially, when the replication system is started, the administration module is responsible for system initialization. As part of this initialization process, at step 401 the administration module captures schema information from the primary database and retains this schema information in an internal format for access by the log reader. The schema information includes metadata regarding the organization of the primary database and its tables. For example, the log may store object identifiers instead of table names and column names. The schema information contains information that enables the table names and columns to be identified from the object identifiers. The schema information is used by the log reader module to build transaction operations from the log records as described below.

At step 402, a user posts a transaction to the primary database either directly or through an application program. A transaction at the primary database could consist of any number of operations (e.g., insert, update, and/or delete operations) relating to data records in the primary database. For example, a user of the primary database may perform a single SQL INSERT operation to insert a row into a table at the primary database. At step 403, when this INSERT operation is committed to the database, a log record is written to the primary database log file (e.g., primary log 313 on the primary server 310 as shown at FIG. 3) as part of the process of inserting the row into the primary database (e.g., primary database 311 as shown at FIG. 3).

In order to capture this transaction at a standby (or replicate) database server, the operation(s) that are recorded in the primary database must be transmitted to, and retained by, the standby server. The approach of the present invention is to copy (or replicate) the information about the transaction which is recorded in the log file at the primary site to a mirrored log which is typically located at the same site (physical location) as the standby server. Typically, the standby server is at a different physical location that then primary server, although this is not required for implementation of the present invention. At step 404, the file mirroring module mirrors (or replicates) the log record being created in the primary database log file to the standby (or replicate) site. In the currently preferred embodiment, the file mirroring module replicates at a file block level the changes made to the primary log to the mirrored log at the standby site. In this manner the mirrored log at the standby site is a mirror image of the primary log. The mirroring process is synchronous so that transaction information about every change committed to the primary database (and recorded in the primary log) is guaranteed to be mirrored at the mirrored site (i.e., duplicated in mirrored log 332 as shown at FIG. 3). Thus, when the primary database writes the insert record to the primary database log file in step 403, the insert record is mirrored to the mirrored primary database log file at the same time.

Next, the log reader module reads the mirrored log record for the insert operation from the mirrored (i.e., duplicate) primary database log file at step 405. The log reader module typically runs on the standby server, although this is not required by the present invention. The log reader extracts information about the transaction posted to the primary database from this mirror copy of the log record of the transaction. At step 406, the log reader module uses the information extracted from the log record and the schema information available from the administration module about the database and database tables to reconstruct the transaction. For instance, the log reader module may use the log record and schema information to construct the SQL INSERT operation so that the same operation can be applied to the replicate database as was applied to the primary database. The log reader module then queues the transaction for distribution by the distribution module. The log reader ensures that the transactions are queued in the same order in which the transactions were applied at the primary database.

At step 407, the distributor module (i.e., the distribution module running at the standby server as shown at FIG. 3) reads the transaction (e.g., the insert operation) from the queue and checks to verify that the transaction ordering is correct. If the transaction ordering is correct, at step 408 the distribution module formats the transaction operation(s) into the same format as the operation(s) applied at the primary database for the transaction. At step 409, the distribution module applies these transaction operation(s) (e.g., the SQL INSERT statement) to the standby (or replicate) database. As a result of these operations same SQL statement is applied to both the primary database and the standby database in the same order so that there is no logical difference between the primary database and the standby database. Furthermore, the methodology of the present invention enables the standby database to be available for use (e.g., for decision support, reporting and other purposes) during this replication process.

It should be noted that one can use a log mirroring module to replicate all transactions posted to the primary database to the replicate (or standby) database using current disk mirroring technology. However, this type of disk mirroring solution means that all database-related data files as well as the log files are synchronously replicated at the file system level. Because the replication of the data files causes changes to the replicate data files required by the replicate database, the replicate database is unable to provide access to those data files simultaneously for decision support or other purposes. In other words, if disk mirroring is used for replication in this manner, the replicate database cannot be used simultaneously for decision support and other purposes.

The methodology of the present invention enables the replicate database to be accessed and used (e.g., responding to SQL queries submitted by users) at the same time data is being replicated to the replicate database. Another advantage of the methodology of the present invention is that the amount of data required to be replicated by the file mirroring module is significantly reduced to include only the log files and any files directly required for reading those log files rather than requiring the file mirroring module to replicate all database-related data files. By combining disk mirroring with logical replication, the methodology of the present invention makes the replicate database available for use while also providing strong safeguards against loss of the primary database and its contents. The process of reconstructing SQL operations from log records and applying these operations to the replicate database will now be described in greater detail.

Log Reader Operations

As previously described, the log reader module is responsible for reading log records from the mirrored (i.e., duplicate) log file and constructing corresponding SQL operations from these records for application against the replicate database. The following pseudocode represents a thread of operation that reads the next record from a mirrored log file and builds an operation (e.g., a SQL operation) using the log record and schema information for the article affected by the log record:

```
                    Log Reader Pseudocode
 1:
 2:    while(application is running)
 3:    {
 4:        logRecord = getNextLogRecord( );
 5:
 6:        objectID = logRecord.getObjectID( );
 7:        opType = logRecord.getOpType( );
 8:
 9:        if(opType != CommitOperation)
10:        {
11:            articleMetaData =
schemaRepository.getArticleMetaData(objectID);
12:            operation = new Operation(logRecord,
articleMetaData);
13:
14:            tranID = operation.getTranID( );
15:            tempOpMap.put(tranID, operation);
16:
17:        }
18:        else
19:        {
20:            commitOperation = new Operation(logRecord);
21:            tranID = operation.getTranID( );
22:
23:            operations = tempOpMap.get(tranID);
24:            operations.add(commitOperation);
25:
26:            transactionQueue.add(new Transaction(operations));
27:        }
28:    }
```

As illustrated in the above pseudocode, operations are grouped by transaction id ("tranID"). When the commit operation for a transaction is encountered (i.e., when the "else" condition at line 18 above is encountered), the transaction is queued for delivery by the distribution module as illustrated at line 26 above ("transactionQueue.add(new Transaction(operations)"). In the currently preferred embodiment, the transaction queue is the only shared resource between the log reader module and the distribution module.

Distribution Module Operations

The distribution module reads an operation placed into the transaction queue by the log reader module, formats this operation into the same format as the operation that was applied at the primary database and applies the operation to the replicate database. The distribution module is responsible for formatting and for sending the operations to the destination (i.e., distributing the operations for application against the replicate database) in a manner that is consistent with how the original transaction was executed at the primary database. The following pseudocode represents a thread of operation of the distribution module that gets the next transaction from the transaction queue (the shared resource between the log reader and the Distributor), formats the transaction, and distributes the transaction to the destination:

```
                Distribution Module pseudocode
 1:
 2:    while(application is running)
 3:    {
 4:        transaction = transactionQueue.getNextTransaction( );
 5:
 6:        if(transaction order is correct)
 7:        {
 8:            formattedTransaction = Formatter.format(transaction);
 9:            distribute(formattedTransaction);
10:        }
11:    }
```

As shown at line 4 above, the distribution module obtains the next transaction from the transaction queue. At line 6, a check is made to determine if the transaction order is correct. If the transaction order is correct, at line 8 the distribution module formats the transaction and at line 9 it distributes the transaction to the destination (i.e., the replicate database).

Reading a Sybase Adaptive Server Enterprise Mirrored Log

As previously described, the file mirroring component of the currently preferred embodiment is an off-the-shelf disk mirroring module. The file mirroring module may be implemented as a standard file replication hardware and/or software solution available from a number of different vendors. For example, either Symmetrix Remote Data Facility (SRDF) from EMC or SnapMirror from Network Appliance, Inc. may be used for replication of the log records from the primary server to the mirrored log. The following discussion regarding the operations of the present invention assumes that the file mirroring component is setup and configured to mirror the database log file from a primary site to a replicate site at a different physical location. Once the file mirroring component is setup, the reading of the mirrored log can proceed. The specific steps required to read the mirrored log are implementation-dependent.

Figure 5:
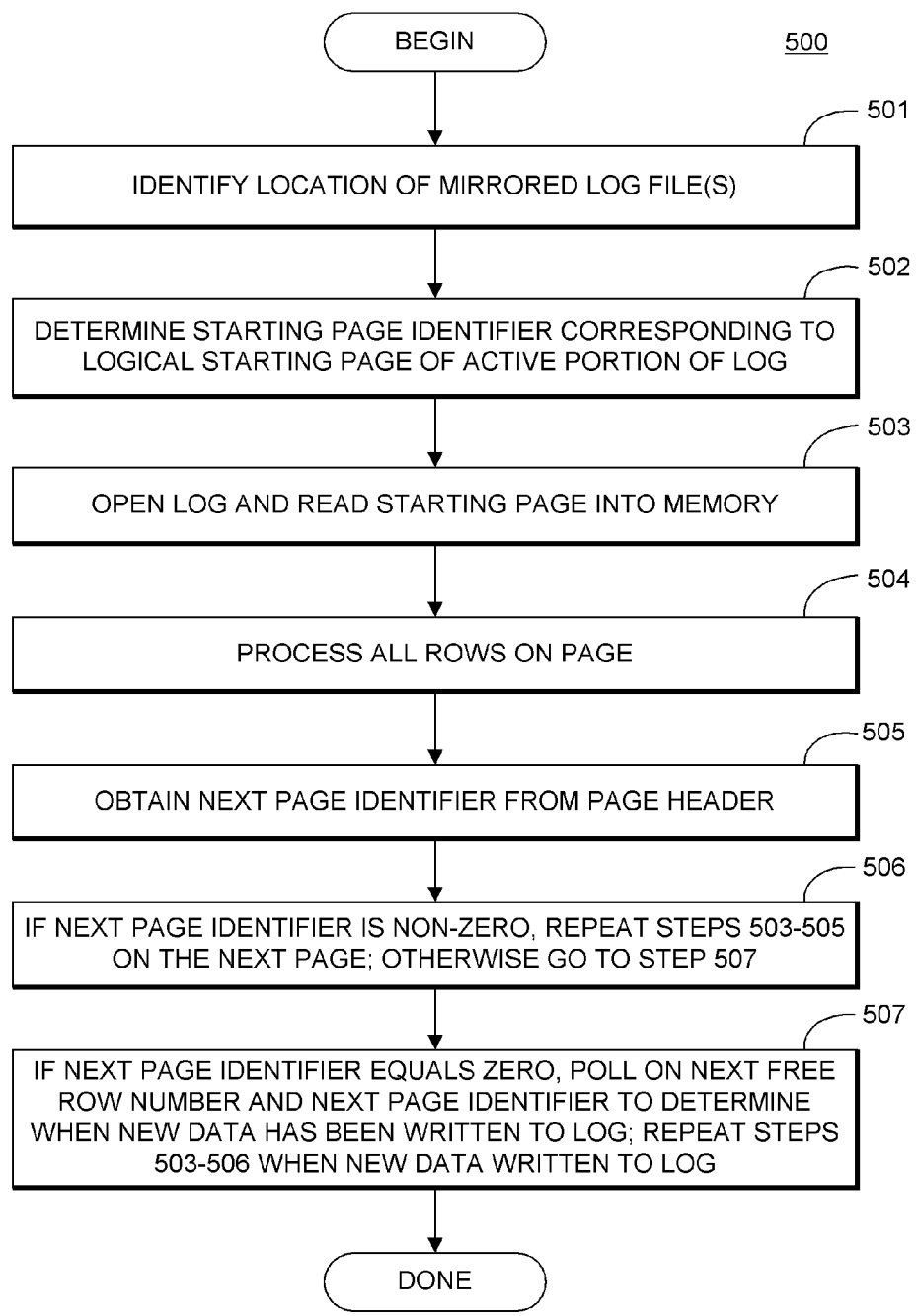
FIG. 5 is a flowchart illustrating the steps required to read the mirrored log written by a Sybase Adaptive Server Enterprise database system.

FIG. 5 is a flowchart 500 illustrating the steps required to read the mirrored log written by a Sybase Adaptive Server Enterprise database system. At step 501 the location of the mirrored log file(s) are identified. At step 502 the starting page identifier in the mirrored log which corresponds to the logical starting page of the active portion of the log with respect to replication is determined.

Next, at step 503 the log device is opened from disk and the starting log page is read into memory. At step 504 all of the rows of log records on that page are processed. When all rows on the page have been processed, at step 505 the next page identifier is obtained from the page header. At step 506, if the next page identifier is non-zero, steps 503-505 are repeated for the next page. Otherwise, if the next page identifier is equal to zero, the process proceeds to step 507. At step 507, the next free row number and the next page id in the page header are polled to determine when new data has been written to the log. If the next free row number changes, this change indicates that additional data was written to the current page that should be processed and steps 504 and following are repeated. If the next page identifier changes, this indicates a new data page has been allocated with logged data and steps 503 and following are repeated for the new page.

The following code segments illustrate the steps involved in reading a log written by a Sybase Adaptive Server Enterprise database system in greater detail. The following "run( )" method from a "RASTranReader.java" class shows the high-level processing:

```
 1:    public void run( )
 2:    {
 3:        synchronized (this)
 4:        {
 5:            _threadStatus = RUNNING;
 6:            notifyAll( );
 7:        }
 8:
 9:        // identify the location of the mirrored log files
10:        initializeTranReader( );
11:
12:        // reposition (i.e., identify the starting point in the log )
13:        reposition( );
14:
15:        // process all of the rows on a page, traverse to the next
16:        // page, handle end of log, and queue operation for distribution.
17:        while ( getThreadStatus( ) != STOP_REQUESTED )
18:        {
19:            try
20:            {
21:                // Open a log reader session with the log context.
22:                _dsLogReader = (ASELogReader)_logContext.openSession( );
23:
24:                // Setup the log scan properties.
25:                LOG_SCAN_PROPS.setScanStartLocator( _currentLocator );
26:                LOG_SCAN_PROPS.setBlockIncrement (super.getScanSleepIncrement( ) * 1000 );
27:                LOG_SCAN_PROPS.setBlockTimeout (super.getScanSleepMax( ) * 1000 );
28:
29:                // Configure the scan to return the first log
30:                // record if the reposition has not yet been scanned. Otherwise
31:                // start scanning from the last known locator,
32:                // which has really been replicated already.
33:                if (_currentLocator.equals(_repositionPoint) )
34:                    LOG_SCAN_PROPS.setSkipFirstRecord( false );
35:                else
36:                    LOG_SCAN_PROPS.setSkipFirstRecord( true );
37:
38:                // Make sure the log scan has the current properties.
39:                _dsLogReader.setScanProperties( LOG_SCAN_PROPS );
40:
41:                // Start the scan. This may block waiting for
42:                // notification that the scan thread has actually started.
43:                _dsLogReader.startScan( );
44:
45:                ASELogOperation lastOp = null;
46:                while ( getThreadStatus( ) != STOP_REQUESTED &&
47:                    _dsLogReader.hasNext( ) )
48:                {
49:                    // Get the next operation from the log reader.
50:                    lastOp = (ASELogOperation)_dsLogReader.nextOperation( );
51:
52:                    if ( lastOp == null )
53:                        continue;
54:
55:                    // Add the operation to queue for distribution
56:                    _operationQueue.put( lastOp );
57:                }
58:
59:                //update the current locator with the scan
60:                // locator (or the lastOp locator?)
61:                _currentLocator = (ASELocator)_dsLogReader.getLocator( );
62:
63:                // Stop the scan.
64:                _dsLogReader.stopScan( );
65:
66:                sleepToNextScan( );
67:            }
```

-continued

```
68:            finally
69:            {
70:                synchronized (this)
71:                {
72:                    if ( _dsLogReader != null )
73:                        _logContext.closeSession( _dsLogReader );
74:                    _dsLogReader = null;
75:                }
76:            }
77:    }
```

As shown above at line 10, the location of the mirrored log file(s) is identified. Next, as illustrated at line 12 a reposition method is called to determine the starting page identifier in the log which corresponds to the logical starting page of the active portion of the log with respect to replication. The "while" loop shown commencing at line 17 provides for processing rows on a page, traversing to the next page, handling the end of the log, and queuing operations for distribution by the distributor module.

The following "scanForward" method shows the log scanning and page traversal process in more detail. The below "scanForward" method is called by the thread started by "_dsLogReader.startScan( )" at line 43 above.

```
 1:    protected void scanForward( ) throws Exception
 2:    {
 3:        //set by RASTranReader
 4:        _startRID = ( _scanProperties.getScanStartLocator( ) instanceof ASELocator ?
 5:            ((ASELocator)_scanProperties.getScanStartLocator( )).getLogOperationRowID( ):
 6:            ((RowID)_scanProperties.getScanStartLocator( )) );
 7:        _currentRID = _startRID;
 8:        _nextRID = _currentRID;
 9:
10:        try
11:        {
12:            //
13:            // loop while the scan max operations property hasn't
14:            // been reached and a stop has not been requested.
15:            //
16:            IOperation op = null;
17:            while ( !_stopRequested && _operationsBuffered < _scanProperties.getMaxOperations( ) )
18:            {
19:                try
20:                {
21:                    // read the operation at the nextRID. May throw
22:                    // InvalidRowIDException if the nextRID points to an invalid page or row number.
23:                    op = (IOperation)readNextOperation( );
24:
25:                    // buffer the operation -- must skip nulls
26:                    bufferOperation( op );
27:
28:                }
29:                catch (InvalidRowIDException e)
30:                {
31:                    //
32:                    // InvalidRowIDException may indicate that the
33:                    // scan has reached the end of a page, or that
34:                    // the scan has hit the end of the active portion
35:                    //of the log
36:                    // Obtain next page id
37:                    // need to access the actual page to find if
38:                    // we've reached the end of the log.
39:                    Page p = _logReader.getLogicalPage(_nextRID.getPageNumber( ));
40:                    int nlp = p.getNextLogicalPageNumber( );
41:
42:                    // check end of log condition (next page id is zero)
```

```
43:            if ( nlp > 0 )
44:            {
45:                // otherwise create a RowID for the first row on the next page.
46:                _nextRID = new RowID( nlp, (short)0 );
47:                continue;
48:            }
49:            else if ( nlp == 0 )
50:            {
51:    // Polling on end of log
52:                // wait for timeout period before checking
53:                // if page is updated
54:                block(_nextRID);
55:
56:                // check if a stop was requested while blocking
57:                if ( _stopRequested )
58:                  break;
59:
60:                // refresh the page from disk and check
61:                // if the new record is available on the current page
62:                Page np = null;
63:                while ( np == null && ! _stopRequested )
64:                {
65:                    if (_logReader.pageModified(p) )
66:                        np = _logReader.getLogicalPage(_nextRID.getPageNumber( ) );
67:                    else
68:                        block(_nextRID);
69:                }
70:
71:                if ( _stopRequested )
72:                  break;
73:
74:                assert np != null: "Invalid (null) page refreshed from log.";
75:                if ( np == null )
76:                    throw new IllegalStateException("Invalid (null) page refreshed from log.");
77:
78:                // check if the nextRID row number now exists on the page.
79:                if ( np.getNextFreeRowNumber( ) > _nextRID.getRowNumber( ) )
80:                {
81:                    // then the row exists on the newly
82:                    // refreshed page, just continue to re-read the current value of nextRID
83:                    continue;
84:                }
85:                else if (np.getNextLogicalPageNumber( ) != 0)
86:                {
87:                    // if we now have a next logical page
88:                    // number, then create a new RowID
89:                    // for the first row on the next page.
90:                    _nextRID = new RowID(np.getNextLogicalPageNumber( ), (short)0);
91:                    continue;
92:                }
93:                else
94:                {
95:                    // the nextRID is not available after
96:                    // blocking on the end of the log, so throw an EndOfLogException
97:                    throw new EndOfLogException( p.getLogicalPageNumber( ) );
98:                }
99:            }
100:           }
101:         }
102:       }
103:       catch (EndOfLogException eole)
104:       {
105:     // reached the end of the log. (thrown from block( ) ). Exit scan
106:           if (ASELogReader._logger.isLoggable(Level.FINER) )
107:             ASELogReader._logger.log(Level.FINER,
        "Reached end of active portion of the log at Row ID=" + _nextRID);
108:       }
109:       catch (Throwable e)
110:       {
111:           //
112:           throw new Exception( "Fatal exception occurred in log scan thread at RowID=" + _nextRID, e );
113:       }
114:       finally
115:       {
116:           _isBlocked = false;
117:
118:           synchronized ( _scanBuffer )
119:           {
120:               _scanBuffer.notifyAll( );
121:           }
122:
123:       }
124:   }
```

As shown commencing at line 17 above, a loop is established to process log records while the "scan max operations" property has not been reached and a stop has not been requested. More particularly, a "readNextOperation" method is called as provided at line 23 to read log records. The "readNextOperation" method is described in more detail below. When all the rows on a page are processed, the next page identifier (next page id) is obtained as shown at lines 39-40. If the next page identifier is non-zero at line 43, then the process of reading log records is repeated on the next page. Otherwise, if the next page identifier is equal to zero at line 49, the next free row number and the next page identifier in the page header are checked to determine when new data has been written to the log. If the next free row number changes, this change indicates additional data was written to the current page that needs to be processed. If the next page identifier changes, this indicates a new data page has been allocated with logged data).

The following "readNextOperation" method is called as shown above to read log operations from the mirrored transaction log:

```
1:  /**
2:   *
3:   * @param op_row_id
4:   * @return
5:   *
6:   * @see #readNextLogRecord(LogRecord)
7:   * @see #processLogRecord(LogRecord)
8:   *
9:   * @throws Invalid RowIDException which percolates up from _logReader.getLogRecord(RowID)
10:  */
11:  protected IOperation readNextOperation( ) throws Exception
12:  {
13:      ASELogOperation op = null;
14:      do
15:      {
16:          op = _operation Builder.buildOperation( readNextLogRecord( ) );
17:      } while ( op == null && ! _stopRequested );
18:
19:      // set the last read locator based on the operation locator.
20:      if ( ! _stopRequested )
21:          _currentOperationLocator = (ASELocator)op.getLocator( );
22:
23:      return op;
24:  }
25:
26:  /**
```

```
27:     * Reads the next raw LogRecord from the log based on the
28:     * current setting of _nextRID.
29:     *
30:     * @return
31:     */
32:    protected LogRecord read NextLogRecord( ) throws Exception
33:    }
34:        LogRecord lr = null;
35:        do
36:        {
37: // read raw log record from disk
38:        // get the raw operation from the log reader.
39:        lr = _log Reader.getLogRecord( _nextRID );
40:
41:        // update current/next row ids
42:        _currentRID = _nextRID;
43:        _nextRID = _nextRID.getNextRowID( );
44:
45:        // increment total ops read statistics
46:        _totalOperationsRead++;
47:
48:        // if this is the first operation read and the scan
49:        // properties request skipping the first record,
drop it and read the next one
50:        } while ( _totalOperationsRead == 1 &&
51:            _scanProperties.isSkipFirstRecord( ) &&
52:            ! _stopRequested );
53:
54:    return lr;
55:    }
```

The above "readNextOperation" method reads the next complete log operation from the log, based on the current setting "_nextRID" as shown at line 39. The "getLogRecord" method itself is described in more detail below. Once the next "LogRecord" object is obtained, the "LogRecord" object is processed by an operation builder to build a complete log operation. The operation builder adds contextual information, such as the schema. The operation builder has a reference to the database context, through which it obtains schema information relevant to the raw log records. The operation builder may read additional raw log records to build a complete operation.

The following "getLogRecord" from an "ASELogReader.java" class illustrates obtaining a page from an underlying mirrored device:

```
1:    /**
2:     * @param rowid
3:     * @return
4:     */
5:    protected LogRecord getLogRecord(RowID rowid) throws Exception, InvalidRowIDException
6:    {
7:        // get the specific virtual page
8:        Page p = getLogicalPage( rowid.getPageNumber( ) );
9:
10:       // get the row buffer from the page.
11:       ByteBuffer buffer = p.getRowBuffer(rowid.getRowNumber( ));
12:
13:       // if the row is not found on the page (page returns null),
then throw an exception.
14:       if (buffer == null)
15:           throw new InvalidRowIDException( rowid );
16:
17:       // create and return a log record for the current row.
18:       return LogRecordFactory.createLogRecord(p, buffer);
19:   }
20:
21:       /**
22:    * Get the page referenced by the logical page number.
23:    *
24:    * @param pageBuffer a ByteBuffer in which to place the data read
from the device
25:    * @param lpage the logical page id to read.
26:    *
27:    * @return Page object encapsulating the read buffer.
28:    *
29:    * @throws Exception
30:    */
31:   synchronized protected Page getLogicalPage(int lpage) throws Exception
32:   {
33:       // if the requested page is the currently held current page, return that.
34:       // Note: the pageModified( ) check may be expensive!
35:       if ( _currentPage != null &&
36:           _currentPage.getLogicalPageNumber( ) == lpage &&
37:           ! pageModified( _currentPage ) )
38:           return _currentPage;
39:
40:       // get the current device based on the logical page id.
41:       IASEDeviceContext dev =
_databaseContext.getDeviceForLogicalPage( lpage );
42:
43:       // open the device if it is not already.
44:       if ( ! dev.isOpen( ) )
45:           dev.open( );
46:
47:       // calculate the virtual page number from the logical
48:       // page id. May throw an exception if the corresponding
device map can't be found.
49:       long vpage =
_databaseContext.getVirtualPageFromLogicalPage(lpage);
50:
51:       // obtain a page buffer to use for the page
52:       ByteBuffer pageBuffer = getPageBuffer( );
53:
54:       // read the virtual page into the page buffer.
55:       dev.readVirtualPage(pageBuffer, vpage );
56:
57:       // rewind the buffer to prepare it for reading.
58:       pageBuffer.rewind( );
59:
60:       // create and return a new Page constructed from the page
buffer.
61:       Page p = PageType.createPage( pageBuffer,
(int)_databaseContext.getLogicalPageSize( ) );
62:
63:       return _currentPage = p;
64:   }
```

Reading an Oracle Mirrored Log

Figure 6A:
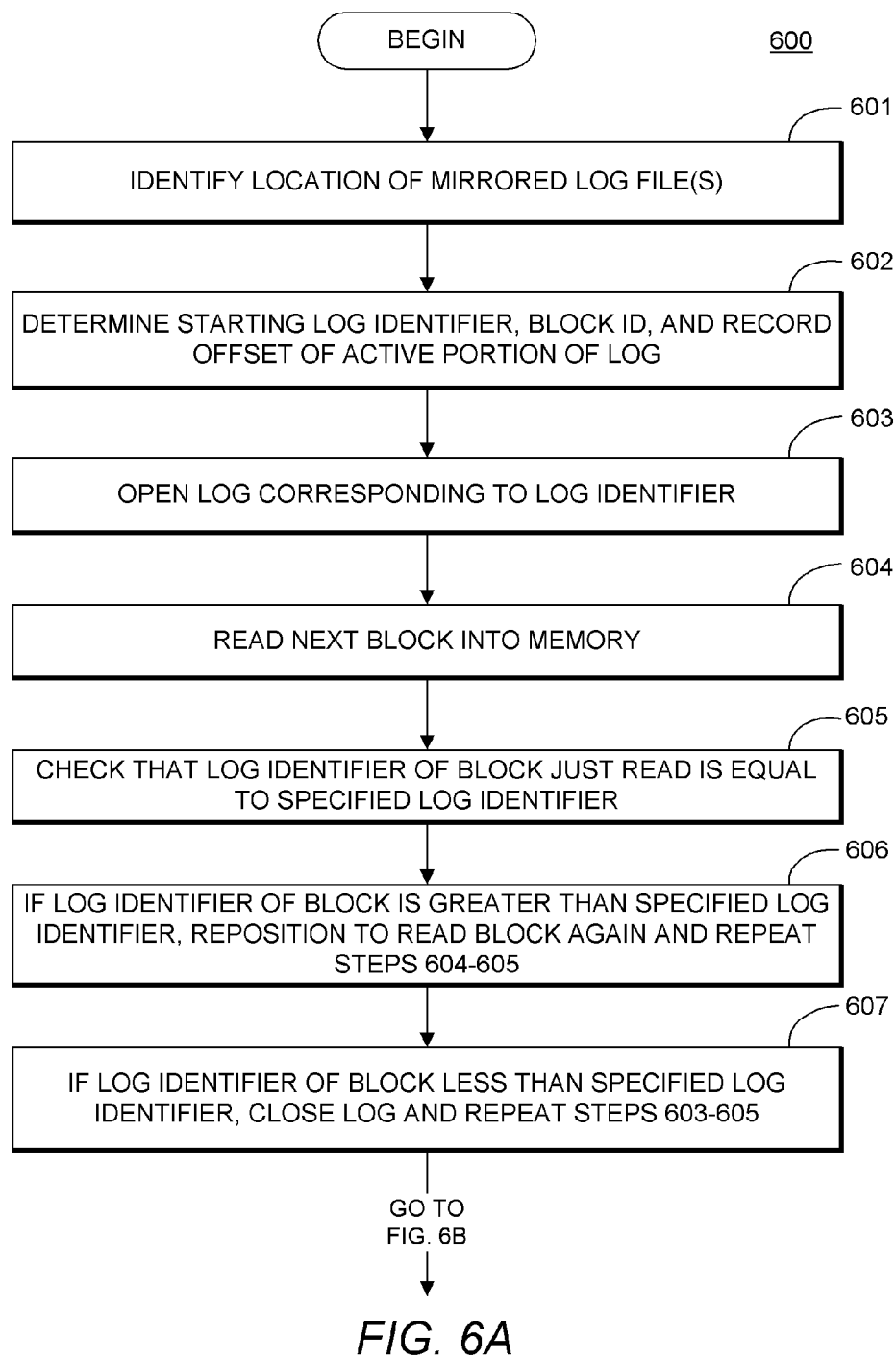
FIGS. 6A-B comprise a single flowchart illustrating the steps required to read the mirrored log written by an Oracle database system.
Figure 6B:
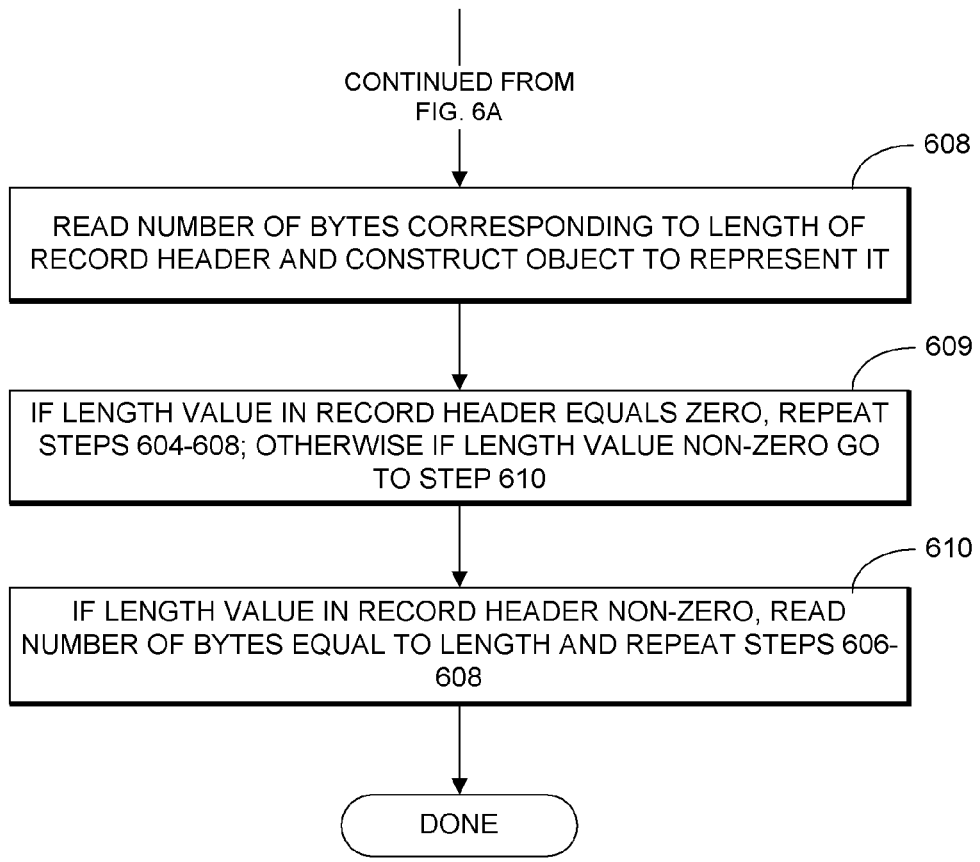

FIGS. 6A-B comprise a single flowchart 600 illustrating the steps required to read the mirrored (replicate) log written by an Oracle database system. As with the above-described Sybase Adaptive Server Enterprise system, the initial step 601 involves identifying the location of the mirrored log file(s). At step 602 the starting log identifier, block id, and record offset of the active portion of the log with respect to replication are determined.

Next, at step 603 the log corresponding to the log identifier is opened from disk. At step 604 the next block is read into memory. At step 605 a check is made to verify that the block just read corresponds to the specified block id determined at step 602. If the log id of the block is greater than the specified log id, this indicates that the end of the log has been reached. In the event the end of the log is reached, at step 606 reposition to read the block again and steps 604-605 are repeated. However, if the log id of the block just read is less than the specified block id, the log has been overwritten by a newer log. In this event, at step 607 the log is closed and steps 603-605 are repeated.

At step 608, the number of bytes corresponding to the length of a record header are read and an object is constructed to represent it. Based the length value in the record header, the method proceeds to step 609 or 610. If the length value is zero the method proceeds to step 609. Otherwise, if the length is non-zero, the method proceeds to step 610. At step 609 if the length is zero steps 604-608 are repeated. If the length is non-zero, at step 610 the number of bytes equal to the length are read and steps 606-608 are repeated.

The following code segments illustrates the steps involved in reading a log written by an Oracle database system in greater detail. Since the Oracle log is made up of many files, the "nextRecord( )" method in an "OracleLogReader" class abstracts individual log files to make them appear as one individual log file. The "OracleLogReader" has a reference to an "OracleLogFileReader (currentLogFile)". The "Oracle-LogFileReader" represents an individual Oracle log file. The following "run( )" method from a "RAOTranReader.java" class shows the high-level processing:

```
1:     public void run( )
2:     {
3:         Object scanResults = null;
4:         int numOps = 0; try
7:         {
8:             // Identify the location of the mirrored log file(s)
9:             startReplication( );
10:
11:            // Identify the starting log id, block id and record offset
    of the active portion of the log with respect to replication.
12:            // Open the log specified by the log id from disk.
13:                // Position in the transaction log before beginning
    first log scan
14:            position( );
15:
16:            while ( !(_stopImmediate || _stopQuiesce) )
17:            {
18:                try
19:                {
20:                    // Execute the log scan and get results back.
21:                    // If no data is found, a NoDataAvailException
    is thrown.
22:                    scanResults = executeLogScan( );
23:
24:                    // Process log operations.
25:                    numOps = processData(scanResults);
26:                }
27:                catch (NoDataAvailException ndae)
28:                {
29:                    // sleep based on configured increment and max
30:                    sleepToNextScan( );
31:                }
32:            }
33:        }
34:        catch (TranReaderStoppedException ex)
35:        {
36:            // Received stop request ... just move on to the
    finally block.
37:        }
38:        catch (TranReaderException ex)
39:        {
40:            // Fire the appropriate event.
41:            Throwable t = ex.getCause( );
42:            if ( t != null && t instanceof ConnException )
43:            {
44:                _threadError = t;
45:
46:                LRThreadEvent.fireEvent( _connectionMgr,
    (ConnException)t, this );
47:            }
48:            else
49:            {
50:                _threadError = ex;
51:
52:                // This gets the TRConnectFailureException.
53:                LRThreadEvent.fireEvent(ex);
54:            }
55:        }
56:        catch (Throwable t)
57:        {
58:            _threadError = t;
59:
60:            // Catch all other possible exceptions and treat them
    as fatal errors.
61:            LRThreadEvent.fireEvent(
    LRThreadEvent.THREAD_ERROR_FATAL, this );
62:        }
63:        finally
64:        {
65:            _threadStatus = ( _threadError == null ? STOP_NORMAL :
    STOP_ERROR );
66:        }
67:    }
```

The "startReplication( )" method shown above at line 9 identifies the location of the mirrored log files. The starting log id, block id, and record offset of the portion of the log active with respect to replication are then identified. The log corresponding to the specified log id is opened from disk and the scan is positioned in the transaction log by a "position" method which is called as shown at line 14. The "position" method is described in more detail below. At lines 22-24, the log scan itself is executed and the scan results are processed.

The following is the "position" method from a "RAOTranReader.java" class as well as an "open( )" method from an OracleLogReader class illustrating the opening and positioning of the log reader for reading an Oracle log:

```
1:     // Identify the starting log id, block id and record offset
    of the active portion of the log with respect to replication.
2:     // Open the log specified by the log id from disk.
3:     private synchronized void position( ) throws Exception
4:     {
5:         if (_stopImmediate || _stopQuiesce)
6:             throw new TranReaderStoppedException( );
7:
8:         _olr.open( ((RAOLocator)_truncPoint).getLogLocator( ) );
9:     }
10:
11:    /**
12:     * Opens the OracleLogReader for reading at the location in the
13:     * log specified by the locator.
14:     *
15:     * @param locator specifies the position in the log to start
16:     * reading. @throws Exception if an error occurs.
17:     */
18:    public void open(ILocator locator) throws Exception
19:    {
20: //
21:        try
22:        {
23:            LogLocator loc = (LogLocator)locator;
24:
25:            Number logID = loc.getOldestActiveTranLogID( );
26:            Number blockID = loc.getOldestActiveTranBlockID( );
27:            Number blockOffset =
    loc.getOldestActiveTranBlockOffset( );
28:
29:            if (logID.intValue( ) == 0)
30:            {
31:                logID = loc.getLogID( );
32:                blockID = loc.getBlockID( );
33:                blockOffset = loc.getBlockOffset( );
34:
35:                if (logID.intValue( ) == 0)
36:                    this.open( );
37:                else
38:                {
39:                    if (blockID.intValue( ) != 0 &&
    blockOffset.intValue( ) != 0)
40:                        this.open(logID, blockID, blockOffset);
41:                    else if (blockID.intValue( ) != 0)
42:                        this.open(logID, blockID);
```

```
43:            else
44:                this.open(logID);
45:            }
46:        }
47:        else
48:        {
49:            this.open(logID, blockID, blockOffset);
50:        }
51:    }
52:    catch(Exception ex)
53:    {
54:        throw new OracleLogReaderException("OLR_OPENERR",
             ex);
55:    }
56: }
```

As shown, the log reader ("OracleLogReader") is opened for reading at the location in the log specified by a "locator" parameter. The locator specifies the position in the log to start reading.

The following "nextBlock( )" method from a "Log-FileReader.java" class reads the next block from the Oracle log file:

```
1:  /**
2:   * Loads the next block in the log.
3:   *
4:   * @return the next block in the log.
5:   * @throws Exception
6:   */
7:  private void nextBlock( ) throws Exception
8:  {
9:      // Get the next block from the file
10:     _currentBlock = ByteBuffer.allocate(BLOCK_SIZE);
11: // Read the next block into memory.
12:     _file.read(block);
13:
14:     // Construct the block header from this block.
15:     _currentBlockHeader = new BlockHeader(block);
16:
17:     // If the log id found in the new block is different
18:     // than the expected log id, the end of the log has
    been reached.
19: // Check that the log id of the block just read is equal
    to the specified log id.
20:     if(!_currentBlockHeader.getLogID( ).equals(_logID))
21:         throw new EndOfLogException( );
22:
23:     return block;
24: }
```

As shown at lines 10-12, the next block is obtained from the file and read. At line 15, a block header is constructed from the block. Next, at line 20 a check is made to determine if the log id found in the new block is equal to the expected (specified) log id. If the log id that is found is different, the end of the log has been reached and an "EndOfLogException" is thrown as provided at line 21.

The below "nextRecord( )" method from a "LogFileReader.java" class reads the next record from the Oracle log file:

```
1:  /**
2:   * Return the next log record in a log file.
3:   *
4:   * @return the next log record in a log file.
5:   * @throws Exception
6:   */
7:  private LogRecord nextRecord( ) throws Exception
8:  {
9:      if(_currentBlock == null)
10:     {
11:         // On startup or when the end of the log has been
    reached, get the next block.
12:         nextBlock( );
13:         int offset =
    _currentBlockHeader.getRecordOffset( ).intValue( );
14:
15:         // If the offset is 0, move to the next block.
16:         while(offset == 0)
17:         {
18:             nextBlock( );
19:             offset =
    _currentBlockHeader.getRecordOffset( ).intValue( );
20:         }
21:
22:         // Position the block at the offset of the first
    record.
23:         _currentBlock.position(offset);
24:     }
25:     else if(_currentBlock.position( ) == BLOCK_SIZE)
26:     {
27:         // If the current position is at the end of the block,
    get the next block.
28:         nextBlock( );
29:     }
30:
31:     // If the record header for the next record can't fit on
32:     // this block, then the rest of the data on this block is
33:     // garbage. Just move to the next block for the next
    record.
34:     int position = _currentBlock.position( );
35:     if(position >= (this.getBlockSize( ) – 8))
36:         nextBlock( );
37:
38:     // Read the number of bytes corresponding to the length of a
    record header and construct an object to represent it.
39:     RecordHeader recordHeader = new
    RecordHeader(_currentBlockHeader, _currentBlock);
40:
41:     // Based on the length value in the record header:
42:     //   a. If the length is zero, go to next block
43:     //   b. If the length is non-zero, read the number of bytes
    equal to length.
44:     int recordLength =
    recordHeader.getRecordLength( ).intValue( );
45:     if(recordLength == 0)
46:     {
47:         // Go to the next block.
48:         nextBlock( );
49:
50:         // Recursively return the next record.
51:         return nextRecord( );
52:     }
53:     else
54:     {
55:         // Allocate a buffer for the record body.
56:         recordBody = ByteBuffer.allocate(recordLength –
    RecordHeader.LENGTH);
57:
58:         while(recordBody.hasRemaining( ))
59:         {
60:             // Get the next byte.
61:             recordBody.put(this.currentBlock( ).get( ));
62:         }
63:     }
64:
65:     //
66:     return LogRecordFactory.createRecord(recordHeader,
    recordBody);
67: }
```

As shown above at lines 9-20, on startup or when the end of the log is reached, the next block is retrieved. At lines 34-36, if the record header for the next record does not fit on the current block, a move to the next block is made for retrieving the next record. At line 39, the number of bytes corresponding to the length of a record header are read and an object is constructed to represent it. As shown at lines 45-52, if the length value of current record header is equal to zero, the method proceeds with obtaining the next block. Otherwise commencing at line 53 the number of bytes equal to the length are read and a "LogRecordFactory.createRecord" method is called to create a record as provided above at line 66.

The following "nextRecord( )" method from an "OracleLogReader.java" class abstracts individual log files to make them appear as one individual log file:

```
1:   /**
2:    * Return the next record in the log.
3:    *
4:    * @return the next record in the log.
5:    * @throws Exception
6:    */
7:   public LogRecord nextRecord( ) throws Exception
8:   {
9:        LogRecord record = null;
10:
11:          try
12:          {
13:              // Save the current block id and the current block offset in case this is the very end of the log.
14:              _currentBlockID = _currentLogFile.currentBlockID( );
15:              _currentBlockOffset = _currentLogFile.currentBlockOffset( );
16:
17:              // Get the next record.
18:              record = (Log Record)_currentLogFile.nextRecord( );
19:          }
20:          catch(EndOfLogException ex)
21:          {
22:              // Is this the end of the current log file or the very end of the log?
23:              // If there is a more recent log that was written, then it's just the end of the current log.
24:
25:// Check that the log id of the block just read is equal to the specified log id.
26://        If the log id of the block is greater than the specified log id, the end of the log has been reached, so re-position to read the block again
27://        If the log id of the block is less than the specified log id, the log has been overwritten by a newer log, so close the log and repeat process of opening (new) log and reading it
28:
29:              Number latestSQN = _logMD.getCurrentLog( ).getLogID( );
30:              Number currentSQN = _currentLogFile.getLogID( );
31:
32:              if(currentSQN.equals(latestSQN))
33:              {
34:                 // This is the very end of the log.
35:
36:                 // Reposition for the next read before throwing the exception.
37:                 _currentLogFile.position(_currentBlockID, _currentBlockOffset);
38:
39:                 throw ex;
40:              }
41:              else
42:              {
43:                 // There is a new log file to read.
44:
45:                 // Open the new log file.
46:                 LogFile newLog = null;
47:                 try
48:                 {
49:                     // Get the next log sequence number.
50:                     Number nextSQN = _logMD.getNextLogSequence(currentSQN);
51:
52:                     boolean open = false;
53:                     while(!open)
54:                     {
55:                       try
56:                       {
57:                         // Get the log file with the given sequence number.
58:                         newLog = logMD.getLog(nextSQN);
59:
60:                         // Open the log file.
```

-continued

```
61:                    newLog.open( );
62:                    open = true;
63:                }
64:            catch(EndOfLogException ex2)
65:                {
66:                    // The possibility exists that the new
log has not been written to yet.
67:
68:                    // If the new log is still the latest log
to be written, just throw an exception.
69:                    if(newLog.getLogID( ).equals(latestSQN))
70:                        throw ex2;
71:
72:                    // Otherwise, the log is empty, so move
to the next log file.
73:                    newLog =
_logMD.getLog(_logMD.getNextLogSequence(nextSQN));
74:                    newLog.open( );
75:                    open = true;
76:                }
77:            }
78:        }
79:        catch(Exception e)
80:            {
81:            // A severe error has occurred.
82:
83:                // Try to close the new log.
84:                try { newLog.close( ); }
85:                catch(Exception ignore) { }
86:
87:                // Try to re-position for reading in the
current log.
88:                _currentLogFile.position(_currentBlockID);
89:                _currentLogFile.position(_currentBlockOffset);
90:
91:                throw e;
92:            }
93:
94:            // The log switch was successful, so close the
previous log before setting the current log to the new log.
95:            _currentLogFile.close( );
96:            _currentLogFile = newLog;
97:
98:            // Recursively get the next record from the new
log.
99:            record = nextRecord( );
100:        }
101:    }
102:    catch(InconsistentLogException ex)
103:        {
104:        // The possibility exists that, if we are reading an
105:        // on online log, the current log could be overwritten
as we are reading it. This just
106:        // means we need to load the archived version of this
107:        // log and start reading from where we left off.
108:
109:        // Get the current log's sequence number and save the
current position.
110:        Number sqn = _currentLogFile.getLogID( );
111:        _currentBlockID = _currentLogFile.currentBlockID( );
112:        _currentBlockOffset =
_currentLogFile.currentBlockOffset( );
113:
114:        // Close the online log.
115:        _currentLogFile.close( );
116:
117:        // Get and open the archived log.
118:        _currentLogFile = _logMD.getLog(sqn);
119:        _currentLogFile.open( );
120:
121:        // Re-position to where we left off.
122:        _currentLogFile.position(_currentBlockID);
123:        _currentLogFile.position(_currentBlockOffset);
124:
125:        // Get the next record.
126:        record = (LogRecord)this.nextRecord( );
127:    }
128:    catch(UnsupportedRecordException ex)
129:        {
130:        throw ex;
```

```
131:        }
132:
133:        return LogRecordFactory.createRecord(record);
134: }
```

As shown at line 18 of the above "nextRecord( )" method, a log record is obtained from the mirrored transaction log. A check is then made for the end of the log. More particularly, a check is made to determine if the log id of the block just read is equal to the specified log id. If log id of the block just read is greater than the specified log id, the end of the log has been reached and at line 37 the log reader is re-positioned to read the block again. However, if the log id of the block is less than the specified log id, the "else" condition at line 41 applies as the log has been overwritten by a newer log. In this event the method proceeds by attempting to locate and open the new log file. Before opening the new log file, the old file is closed. The method then proceeds with reading records from the new log file.

Log Reader Module Constructs Log Record

As described above, a log reader module ("LogReader") constructs log record objects from the mirrored transaction log. A "LogRecord" object is constructed from each log record processed as described above. Generally, a LogRecord object simply contains a header and a data portion. The header contains information required to interpret the data portion of the record. The log reader module uses the LogRecord objects together with database schema information to reconstruct transaction operations and queue these operations for distribution. For transactional records (begin/commit/rollback), the LogRecord object is converted into a change set object and queued for distribution. However additional steps are required for change data records (i.e., records reflecting modifications to data in the database).

The following steps are involved in converting these change data records for distribution and application against the replicate database. First, the object id is obtained from the log record. Next, the appropriate schema object from the administration module is loaded based upon this object id. The schema information (specifically column location and datatype) is required to translate the raw data format into the specific datatype of the column the data represents. Based upon this schema information, the log record with the translated id is then converted into a change set object and queued for distribution. In this fashion the transaction is reconstructed from the (mirrored) log records so that it can be applied at the replicate database.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

The invention claimed is:

1. A method for capturing database changes at a primary database and applying those changes to a replicate database while the replicate database remains on-line and available for use, the method comprising:
monitoring transactions occurring at the primary database for detecting changes made to the primary database;
recording information about transactions observed to have occurred at the primary database in a transaction log;
synchronously copying the information about the transactions recorded in the transaction log to a remote site, so as to create at the remote site a mirrored transaction log that is guaranteed to contain at a synchronized point in time an exact copy of the transactions recorded in the transaction log at the primary database;
copying database schema from the primary database to the remote site when the database schema is determined to be modified, to enable transactions to be reconstructed and applied at the replicate database;
wherein said monitoring and recording steps occur at a primary site;
wherein, while the replicate database remains on-line and available for use, changes made at the primary database are replicated to the replicate database by:
said transactions at the replicate database being reconstructed based on the information about the transactions copied to the mirrored transaction log, the information including database schema of the primary database identified as modified and copied to the remote site; and
the reconstructed transactions being asynchronously applied at the replicate database;
wherein the primary site and remote site are different physical locations.

2. The method of claim 1, wherein said transactions include selected ones of a Structured Query Language (SQL) "INSERT", "UPDATE", "DELETE", "DDL" and "Procedure" operation.

3. The method of claim 1, wherein said recording step includes recording at least one log record about one of the transactions in the transaction log.

4. The method of claim 3, wherein said at least one log record characterizes changes made to the primary database in the transaction.

5. The method of claim 1, wherein said synchronously copying step includes using a file mirroring module.

6. The method of claim 1, wherein said synchronously copying step includes using file replication hardware.

7. The method of claim 1, wherein said synchronously copying step includes using file replication software.

8. The method of claim 1, wherein said synchronously copying step includes synchronously copying information to the transaction log and the mirrored transaction log before completing the transaction at the primary database.

9. The method of claim 1, wherein said synchronously copying step includes replicating at a file block level the information about the transactions in the transaction log to the mirrored transaction log.

10. The method of claim 1, wherein, at the replicate database, said transactions are formatted to have the same format as the transactions at the primary database.

11. The method of claim 1, wherein, at the replicate database, said reconstructed transactions are asynchronously applied and verified that the reconstructed transactions are ordered correctly.

12. The method of claim 1, wherein, at the replicate database, said reconstructed transactions are asynchronously applied in the same order as the transaction order at the primary database.

13. The method of claim 1, further comprising:
wherein, at the replicate database, a database query is responded to while a transaction is being replicated from the primary database to the replicate database.

14. The method of claim 1, further comprising:
downloading a set of computer-executable instructions for performing the method of claim 1.

15. A system for replicating transactions from a source database to a standby database, the system comprising:
source and standby databases sharing a common schema, the source database having a transaction log for recording log records for transactions performed at the source database, wherein the transaction log is at a primary site;
a mirrored transaction log operable to record mirror copies of the log records for transactions performed at the source database, so as to create at a remote site an exact synchronous copy of the transaction log at a given point in time;
a file mirroring module operable to synchronously replicate log records from the transaction log to the mirrored transaction log as transactions are performed at the source database;
database schema for the source database, wherein the database schema is copied to the remote site to enable transactions to be reconstructed and applied at the standby database;
a log reader module at the remote site operable to read log records in the mirrored transaction log and reconstruct transactions for application to the standby database based upon the database schema and log records in the mirrored transaction log;
a distribution module operable to asynchronously apply the transactions reconstructed by the log reader module to the standby database; and
a module operable to determine that the database schema of the primary database has been modified, and copy the modified database schema to the remote site;
wherein both the source and standby databases remain on-line for use while transactions are replicated from one to the other; and
wherein the primary site and remote site are different physical locations.

16. The system of claim 15, wherein said standby database is available for responding to database queries while transactions are being replicated from the source database to the standby database.

17. The system of claim 15, wherein said transactions include a selected one of a Structured Query Language (SQL) "INSERT", "UPDATE", "DELETE", "DDL" and "Procedure" operation.

18. The system of claim 15, wherein said log records characterize changes made to the source database based upon transactions performed at the source database.

19. The system of claim 15, wherein said file mirroring module comprises file replication hardware.

20. The system of claim 15, wherein said file mirroring module comprises a disk mirroring module.

21. The system of claim 15, wherein said file mirroring module is operable to replicate log records in the transaction log to the mirrored transaction log at a file block level.

22. The system of claim 15, wherein said file mirroring module is operable to replicate log records relating to a particular transaction performed at the source database to the mirrored transaction log before said particular transaction is completed at the source database.

23. The system of claim 15, wherein said log reader module is operable to format the reconstructed transactions so that the reconstructed transactions are in the same format as the transaction at the source database.

24. The system of claim 15, wherein said distribution module is operable to apply reconstructed transactions at the standby database in the same order as the order of transactions applied at the source database.

25. A method for replicating database operations from a first database to a second database while making the second database available for decision support purposes, the method comprising:
copying database schema from the first database to the second database prior to performing an operation at the first database;
as database operations are performed at the first database, generating a first set of log records characterizing said operations and recording them in a first log, so that the first log reflects all changes made to the first database, wherein the first log and first database are located at a primary site;
as the first set of log records are recorded in the first log, synchronously recording in a second log located at a remote site a second set of log records that comprise an exact copy of the first set of log records, so that said second log comprises at a synchronized point in time an exact copy of said first log; and
wherein, while the second database is available for decision support purposes, said operations performed at the first database are asynchronously replicated at the second database by asynchronously performing the substeps of:
constructing replicate operations based, at least in part, on said second set of log records recorded in the second log and said database schema; and
applying the replicate operations at the second database;
wherein the primary site and the remote site are different physical locations.

26. The method of claim 25, wherein said operations include selected ones of a Structured Query Language (SQL) "INSERT", "UPDATE", "DELETE", "DDL" and "Procedure" operation.

27. The method of claim 25, wherein said synchronously recording step includes file mirroring.

28. The method of claim 25, wherein said synchronously recording step includes replicating said at least one log record to the second log at a file block level.

29. The method of claim 25, wherein said synchronously recording step includes using a disk mirroring module.

30. The method of claim 25, further comprising:
tracking modifications to said database schema at the first database; and
constructing a replicate operation based on said database schema in effect when the operation is performed at the first database.

31. The method of claim 25, further comprising:
assigning a unique identifier to database objects at the first database;
if a database object is modified, assigning a different unique identifier to the database object that is modified; and
determining a particular database object to be used in constructing a replicate operation based upon said unique identifier assigned to said particular database object.

32. The method of claim 25, wherein said constructing substep includes formatting the replicate operations in the same manner as said operations at the first database.

33. The method of claim 25, wherein said applying substep includes applying the replicate operations at the second database in the same order as said operations are applied at the first database.

34. The method of claim 25, wherein making the second database available for decision support purposes includes responding to a database query as said operation is being replicated.

35. The method of claim 25, wherein making the second database available for decision support purposes includes providing access to data in the second database as said operation is being replicated.

36. A method for replicating transactions from a primary database to a replicate database while the replicate database remains available for use, the primary database and the replicate database sharing a common schema, the method comprising:

recording log records for transactions being performed at a primary database in a primary transaction log at a primary site;
synchronously creating a mirrored transaction log at a remote site, the mirrored transaction log comprising an exact and synchronized copy of the log records in the primary transaction log;
copying database schema from the primary database to the remote site to enable transactions to be reconstructed and applied at the replicate database when the database schema is determined to be modified;
generating reconstructed transactions based on the copies of the log records in the mirrored transaction log and the copied database schema at the remote site; and
asynchronously applying the reconstructed transactions at the replicate database while the replicate database remains available for use;

wherein the primary site and the remote site are different physical locations.

37. A computer storage medium encoded with a computer program, the program comprising instructions that when executed by one or more processors cause the one or more processors to perform operations comprising:

monitoring transactions occurring at the primary database for detecting changes made to the primary database;
recording information about transactions observed to have occurred at the primary database in a transaction log;
synchronously copying the information about the transactions recorded in the transaction log to a remote site, so as to create at the remote site a mirrored transaction log that is guaranteed to contain at a synchronized point in time an exact copy of the transactions recorded in the transaction log at the primary database;
copying, database schema from the primary database to the remote site to enable transactions to be reconstructed and applied at the replicate database when the database schema is determined to be modified;
wherein said monitoring and recording steps occur at a primary site;
wherein, while the replicate database remains on-line and available for use, changes made at the primary database are replicated to the replicate database by:
said transactions at the replicate database being reconstructed based on the information about the transactions copied to the mirrored transaction log, the information including database schema of the primary database identified as modified and copied to the remote site; and
the reconstructed transactions being asynchronously applied at the replicate database;
wherein the primary site and remote site are different physical locations.

* * * * *